United States Patent
Min et al.

(10) Patent No.: US 10,732,713 B2
(45) Date of Patent: Aug. 4, 2020

(54) VEHICLE AND CONTROL METHOD THEREOF

(71) Applicants: HYUNDAI MOTOR COMPANY, Seoul (KR); KIA MOTORS CORPORATION, Seoul (KR)

(72) Inventors: Jungsang Min, Seoul (KR); Jongmin Oh, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/720,078

(22) Filed: Sep. 29, 2017

(65) Prior Publication Data

US 2018/0224938 A1 Aug. 9, 2018

(30) Foreign Application Priority Data

Feb. 8, 2017 (KR) .......................... 10-2017-0017364

(51) Int. Cl.
| | |
|---|---|
| *G08B 6/00* | (2006.01) |
| *G06F 3/01* | (2006.01) |
| *G06F 3/041* | (2006.01) |
| *G06F 3/0354* | (2013.01) |
| *H04R 1/02* | (2006.01) |

(52) U.S. Cl.
CPC .......... *G06F 3/016* (2013.01); *G06F 3/03547* (2013.01); *G06F 3/0416* (2013.01); *H04R 1/025* (2013.01); *H04R 2499/13* (2013.01)

(58) Field of Classification Search
CPC .... G06F 3/016; G06F 3/03547; G06F 3/0416; H04R 1/025; H04R 2499/13
USPC ......................................................... 340/407.2
See application file for complete search history.

(56) References Cited

U.S. PATENT DOCUMENTS

| | | | |
|---|---|---|---|
| 6,030,480 A * | 2/2000 | Face, Jr. ................ | B32B 37/144 156/160 |
| 6,509,890 B1 | 1/2003 | May | |
| 8,421,609 B2 * | 4/2013 | Kim .................... | H04N 1/00411 340/407.1 |
| 2007/0200466 A1 * | 8/2007 | Heim ................... | F04B 43/0054 310/311 |

(Continued)

FOREIGN PATENT DOCUMENTS

| | | |
|---|---|---|
| KR | 101184516 | 9/2012 |
| KR | 1020130010538 | 1/2013 |
| KR | 1020150037027 | 4/2015 |

*Primary Examiner* — Naomi J Small
(74) *Attorney, Agent, or Firm* — Lempia Summerfield Katz LLC

(57) ABSTRACT

A vehicle includes an input apparatus configured to sense pressure through a pressure sensing area and a vibration generator configured to include a first layer and a second layer, in which a plurality of actuators for generating vibration is arranged. The first and second layers are stacked at positions corresponding to pressure sensing positions of a pressure sensing area. The apparatus includes a controller configured to control the vibration generator to generate a first vibration at a position corresponding to a sensing position of the pressure on the pressure sensing area through the first layer, and to generate a second vibration at a position corresponding to a direction of the sensed pressure on the pressure sensing area through the second layer. A method of controlling the vehicle utilizes the input apparatus.

14 Claims, 16 Drawing Sheets

(56) References Cited

U.S. PATENT DOCUMENTS

| | | | |
|---|---|---|---|
| 2009/0021354 A1* | 1/2009 | Furusho | G06F 3/016 340/407.1 |
| 2011/0102326 A1* | 5/2011 | Casparian | G06F 3/016 345/168 |
| 2011/0163946 A1 | 7/2011 | Tartz et al. | |
| 2011/0187655 A1* | 8/2011 | Min | G06F 1/1643 345/173 |
| 2011/0187658 A1* | 8/2011 | Song | G06F 3/041 345/173 |
| 2012/0218200 A1* | 8/2012 | Glazer | G06F 3/017 345/173 |
| 2018/0004293 A1* | 1/2018 | Bella | G09B 21/004 |

* cited by examiner

VEHICLE AND CONTROL METHOD THEREOF

CROSS-REFERENCE TO RELATED APPLICATION

This application claims priority to and the benefit of Korean Patent Application No. 10-2017-0017364, filed on Feb. 8, 2017 in the Korean Intellectual Property Office, the entire disclosure of which is incorporated herein by reference.

BACKGROUND

1. Field

Embodiments of the present disclosure relate to a vehicle including an input apparatus sensing pressure and a method of controlling the vehicle.

2. Description of the Related Art

With the development of vehicle-related techniques, many vehicles have various functions for improving a passenger's convenience or comfort in addition to the basic driving function of a vehicle.

However, the more functions a vehicle has, the more operating load a driver undergoes. Excessive operating load deteriorates a driver's concentration on driving, resulting in interference with safe driving. Also, as a vehicle has more functions, a driver's difficulties in operating the vehicle might increase accordingly. A driver who has difficulties at operating a vehicle might be not able to properly use all the functions the vehicle can perform.

In order to overcome the problem, studies have been and are being actively conducted into a vehicle-mounted input device for reducing a driver's operating load and difficulties. A representative example of such a vehicle-mounted input device is a touch input device capable of detecting a driver's touch input. When a vehicle has such a touch input device, a driver would be able to easily control aspects and functions of the vehicle by touching the touch input device without having to perform any complicated manipulation.

SUMMARY

Therefore, it is an aspect of the present disclosure to provide a vehicle with the capability of generating a first vibration and a second vibration in a pressure sensing area based on a position and a direction of a sensed pressure. It is also an aspect of the present disclosure to provide a method of controlling the vehicle.

In accordance with one aspect of the present disclosure, a vehicle includes an input apparatus configured to sense pressure through a pressure sensing area. The vehicle also includes a vibration generator configured to include a first layer and a second layer in which a plurality of actuators for generating vibration is arranged. The first layer and second layer are stacked at positions corresponding to a plurality of pressure sensing positions of the pressure sensing areas. The vehicle further includes a controller configured to control the vibration generator to generate a first vibration at a position corresponding to a sensing position of the pressure on the pressure sensing area through the first layer. The controller is also configured to control the vibration generator to generate a second vibration at a position corresponding to a direction of the sensed pressure on the pressure sensing area through the second layer.

The controller may be configured to control the vibration generator to generate the second vibration by using an actuator corresponding to a direction of the sensed pressure among the plurality of actuators constituting the second layer.

The controller may be configured to determine an actuator used to generate the second vibration based on an area on the second layer corresponding to the direction of the sensed pressure.

The controller may be configured to determine an actuator used to generate the second vibration based on a difference between the direction of the sensed pressure and the direction from the position of the sensed pressure to each of the plurality of actuators constituting the second layer.

The controller may be configured to control the vibration generator to generate the first vibration by using an actuator corresponding to the position of the sensed pressure among the plurality of actuators constituting the first layer.

The controller may be configured to determine an actuator used to generate the first vibration based on a distance between the position of the sensed pressure and each of the plurality of actuators constituting the first layer.

The controller may be configured to control the vibration generator to sequentially generate the first vibration and the second vibration.

The controller may be configured to control the vibration generator to generate a second vibration at a position corresponding to a direction of the sensed pressure in the pressure sensing area through the second layer when the sensed pressure is equal to or higher than a predetermined reference intensity.

The input apparatus may be configured to sense the pressure through the pressure sensing area, which may have a concave shape.

Each of the plurality of actuators arranged in the first layer of the vibration generator may be provided at a position corresponding to each of the plurality of actuators arranged in the second layer.

In accordance with another aspect of the present disclosure, a method of controlling a vehicle includes the vehicle being provided with an input apparatus configured to sense pressure through a pressure sensing area. The method includes further providing a vibration generator including a first layer and a second layer, in which a plurality of actuators for generating vibration is arranged. The first layer and second layer are stacked at positions corresponding to pa plurality of pressure sensing positions of the pressure sensing area. The method further includes sensing the pressure through the pressure sensing area; generating a first vibration at a position corresponding to a position of the sensed pressure in the pressure sensing area through the first layer; and generating a second vibration at a position corresponding to a direction of the sensed pressure in the pressure sensing area through the second layer.

The generating the second vibration may include generating the second vibration using an actuator corresponding to the direction of the sensed pressure among the plurality of actuators constituting the second layer.

The generating the second vibration may include determining an actuator used to generate the second vibration based on an area corresponding to the direction of the sensed pressure on the second layer.

The generating the second vibration may include determining an actuator used to generate the second vibration based on a difference between the direction of the sensed pressure and the direction from the position of the sensed pressure to each of the plurality of actuators constituting the second layer.

The generating the first vibration may include generating the first vibration using an actuator corresponding to the position of the sensed pressure among the plurality of actuators constituting the first layer.

The generating the first vibration may include determining an actuator used to generate the first vibration based on a distance between the position of the sensed pressure and each of the plurality of actuators constituting the first layer.

The generating the second vibration may include generating the second vibration after the first vibration is stopped.

The generating the second vibration may include generating the second vibration at a position corresponding to the direction of the sensed pressure in the pressure sensing area through the second layer when the sensed pressure is equal to or higher than a predetermined reference intensity.

The sensing the pressure may include sensing the pressure through the pressure sensing area, which may have a concave shape.

Each of the plurality of actuators arranged in the first layer of the vibration generator may be provided at a position corresponding to each of the plurality of actuators arranged in the second layer.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Hereinafter, a vehicle and a control method thereof is described in detail with reference to the accompanying drawings.

Figure 1:
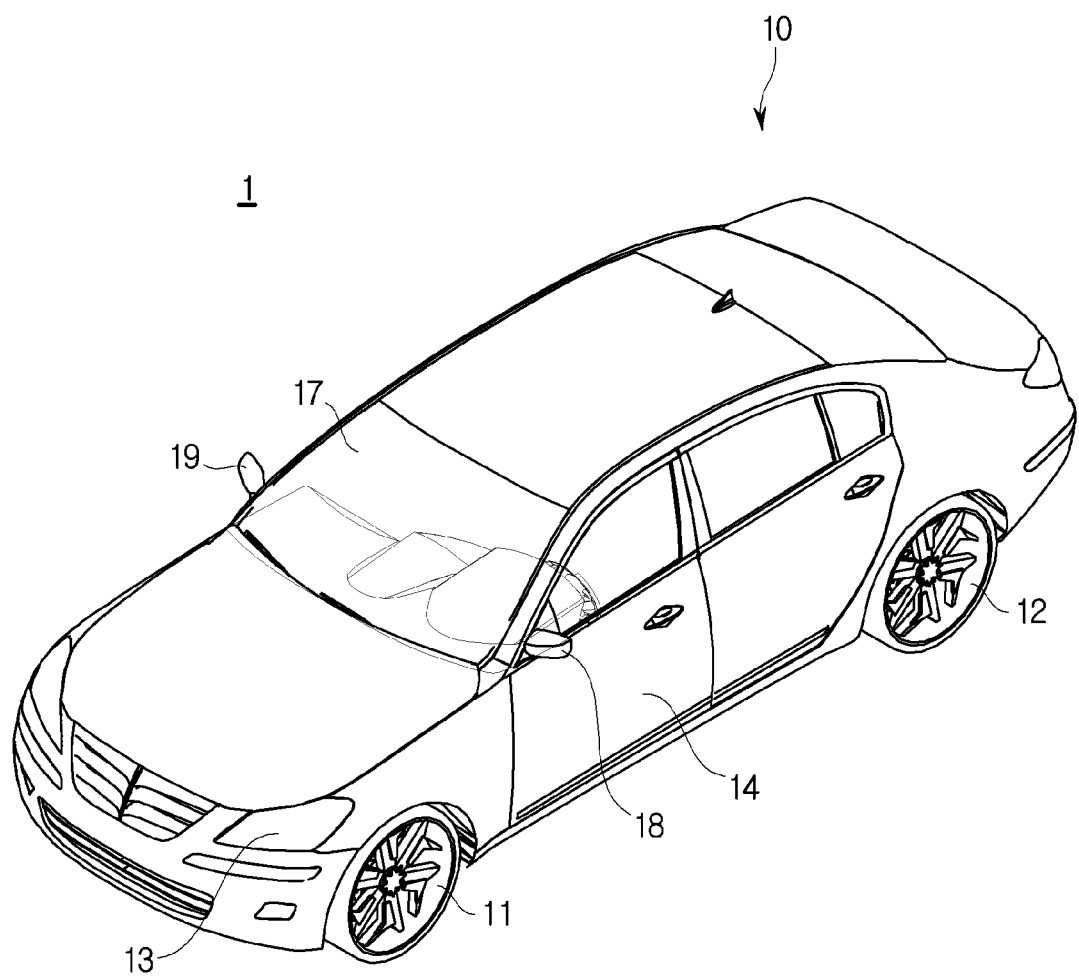
FIG. 1 shows an outer appearance of a vehicle according to one embodiment of the present disclosure.

FIG. 1 shows an outer appearance of a vehicle according to one embodiment of the present disclosure.

Referring to FIG. 1, a vehicle 1 may include a main body 10 forming the outer appearance of the vehicle 1, a plurality of wheels 11 and 12 to move the vehicle 1, a plurality of doors 14 to shield the interior of the vehicle 1 from the outside, a front glass 17 to provide a driver inside the vehicle 1 with a front view of the vehicle 1, and side-view mirrors 18 and 19 to provide the driver with rear views of the vehicle 1.

The wheels 11 and 12 may include front wheels 11 provided in the front portion of the vehicle 1 and rear wheels 12 provided in the rear portion of the vehicle 1. The front wheels 11 or the rear wheels 12 may receive rotatory power from a driving apparatus, such as an engine or motor (not shown) to move the main body 10 forward or backward.

The plurality of doors 14 may be provided on the left and right sides of the main body 10 to allow the driver to open one of the plurality of doors 14 to enter the vehicle 1. Also, the plurality of doors 14 may shield the interior of the vehicle 1 from the outside when all of the doors 14 are closed.

The front glass 17 may be provided in the upper front portion of the main body 10 to provide the driver inside the vehicle 1 with a view toward the front of the vehicle 1. The front glass 17 is also called a windshield glass.

The side-view mirrors 18 and 19 may include a left side-view mirror 18 provided on the left side of the main body 10 and a right side-view mirror 19 provided on the right side of the main body 10 to provide the driver inside the vehicle 1 with rear and side views of the vehicle 10.

Figure 2:
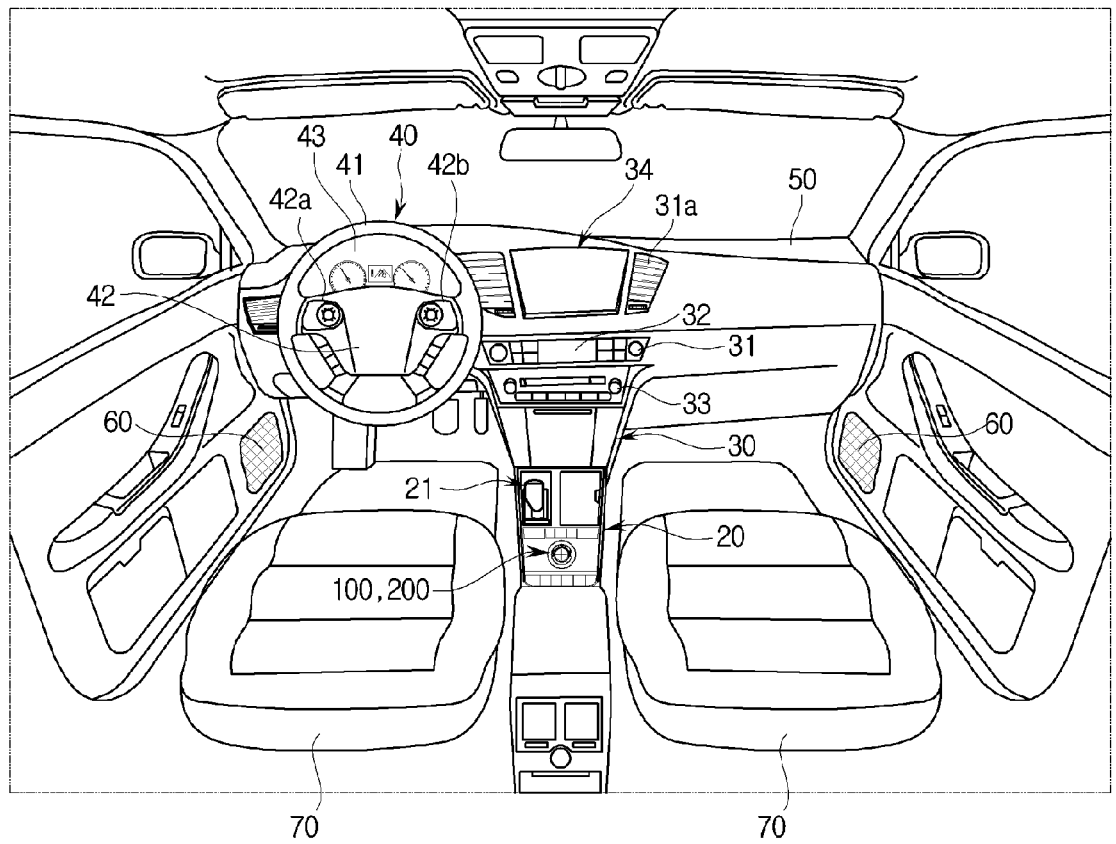
FIG. 2 shows an interior of a vehicle according to one embodiment of the present disclosure.

FIG. 2 shows the interior of a vehicle 1 according to one embodiment of the present disclosure.

Referring to FIG. 2, the vehicle 1 may include a plurality of seats 70 in which a driver and any passengers sit. The vehicle 1 may further include a dashboard 50 under which a gear box 20 is provided and on which a center fascia 30 and a steering wheel 40 are provided.

The gear box 20 may include a transmission lever 21 for shifting gears and a dial manipulator (not shown) for controlling functional execution of the vehicle 1.

The steering wheel 40 installed in the dashboard 50 may be used to change the driving direction of the vehicle 1. The steering wheel 40 may include a rim 41 that can be gripped by a driver and a spoke 42 connected to a steering apparatus of the vehicle 1. The spoke 42 connects the rim 41 to a hub of a rotation shaft for steering. According to one embodiment, the spoke 42 may include a plurality of manipulators 42a and 42b for controlling various devices (for example, an audio system) of the vehicle 1.

A cluster 43 may display a speed gauge representing the speed of the vehicle 1 and a tachometer or gauge displaying revolutions per minute (RPM) representing the RPM of the vehicle 1. The cluster 43 allows a driver to check information about the vehicle 1 at any given time. Also, the cluster 43 may display information about the vehicle 1, such as information related to driving of the vehicle 1. For example, the cluster 43 may display a Distance to Empty (DTE)

calculated based on the amount of remaining fuel, navigation information, audio information, and the like.

The cluster 43 may be disposed in an area facing the steering wheel 40 on the dashboard 50, so that the driver can check information about the vehicle 1 while looking ahead during driving.

Although not shown in the drawings, the dashboard 50 may include a Head Up Display (HUD) to display visual information for the driver on the front glass 17.

An air conditioner of the vehicle 1 may be operated by a button or dial 31 provided in the center fascia 30 on the dashboard 50. A clock 32, an audio system 33, a display, and the like May also be installed or provided on the center fascia 30.

The air conditioner button or dial 31 may be used to adjust the temperature, humidity, air quality, and flow of the air inside the vehicle 1 to achieve a more comfortable interior environment of the vehicle 1. The air conditioner may include at least one vent 31a installed in the center fascia 30 and be configured to discharge air. A driver or a passenger may use the button or dial 31 provided on the center fascia 30 to control the air conditioner.

The clock 32 may be positioned around the button or dial 31 for controlling the air conditioner.

The audio system 33 may include an operating panel on which a plurality of buttons for executing the functions of the audio system 33 is arranged. The audio system 33 may provide a radio mode to provide a radio function and a media mode to reproduce an audio file stored in storage medium that stores audio files.

The audio system 33 may output an audio file as sound through a plurality of speakers 60. FIG. 2 shows an example in which the speakers 60 are installed on the inside of the doors 14. Alternatively, the speaker 60 may be provided at any other location.

The display 34 may display various information directly or indirectly related to the vehicle 1. For example, the display 34 may display direct information, such as navigation information of the vehicle 1, state information of the vehicle 1, and the like. The display 34 may also display indirect information, such as multimedia information including images and moving images received from an internal device of the vehicle 1 or from an external device.

Also, the display 34 may display navigation information such as a map image.

The display 34 may be a Liquid Crystal Display (LCD), a Light Emitting Diode (LED) display, a Plasma Display Panel (PDP) display, an Organic Light Emitting Diode (OLED) display, or a Cathode Ray Tube (CRT) display. The display 34 is not limited to these devices.

The dashboard 50 may further include an input apparatus for sensing a touch and/or a pressure performed by a driver and generating a control command. Hereinafter, a vehicle which generates a vibration based on the pressure sensed by the input apparatus is described in detail.

Figure 3:
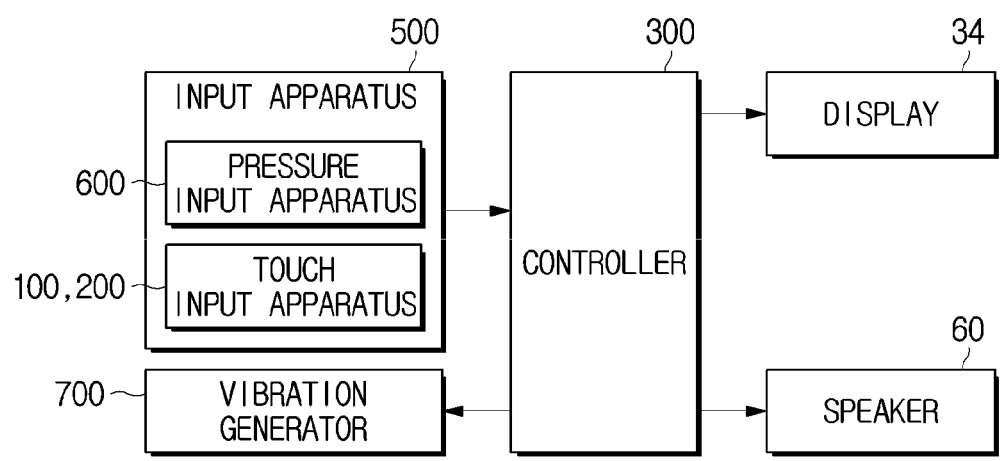
FIG. 3 is a control block diagram of a vehicle according to one embodiment of the present disclosure.

FIG. 3 is a control block diagram that is representative of the vehicle 1 according to one embodiment of the present disclosure.

The vehicle 1 according to one embodiment may include the display 34 for displaying navigation information; at least one of the speakers 60 for outputting sound; a vibration generator 700 for generating vibration; an input apparatus 500 for sensing a pressure and a touch performed by an occupant; and a controller 300 for controlling each configuration corresponding to the sensed pressure.

The display 34 and the speaker 60 are the same as those described with reference to FIGS. 1 and 2, and a description thereof is omitted. As used herein, the terms driver, passenger, and occupant may be used interchangeably when referring to the operation and use of the disclosed input apparatus embodiments.

The input apparatus 500 may sense the touch and the pressure applied or input by an occupant, which may include the driver or a passenger, as a control command to the vehicle 1. To this end, the input apparatus 500 may include a touch input apparatus 100 or 200 for sensing the touch applied or input by the occupant. The input apparatus 500 may include a pressure input apparatus 600 for sensing the pressure applied or input by the occupant.

The touch input apparatus 100 or 200 may sense a touch made by the occupant including the driver. The touch input apparatus 100 or 200 may be implemented in various ways within a technical concept for sensing touches. For example, the touch input apparatus 100 or 200 may be provided as an independent configuration inside the vehicle 1. The touch input apparatus 100 or 200 may also be provided by being coupled to at least one configuration inside the vehicle 1. The touch input apparatus 100 or 200, provided by being coupled to a configuration inside the vehicle 1, may be combined with the display 34 and implemented as a touch screen.

The touch input apparatus 100 or 200, which is independently provided in the vehicle 1 may be provided in various shapes, for example, in a surface shape capable of sensing a touch, or in a circular or an oval shape.

Also, the touch input apparatus 100 or 200 according to one embodiment of the present disclosure may include a concave area that is depressed toward the center and which may sense a touch on the concave area.

Figure 4A:
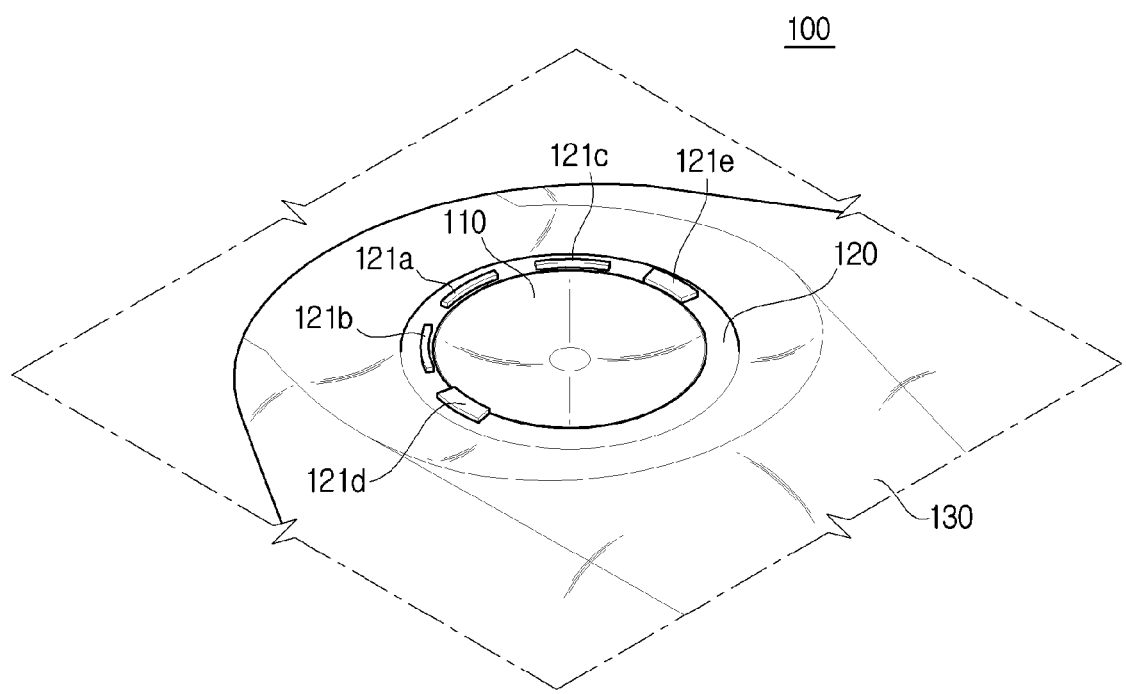
FIGS. 4A, 4B, and 4C are views for describing a touch input apparatus according to one embodiment of the present disclosure.
Figure 4B:
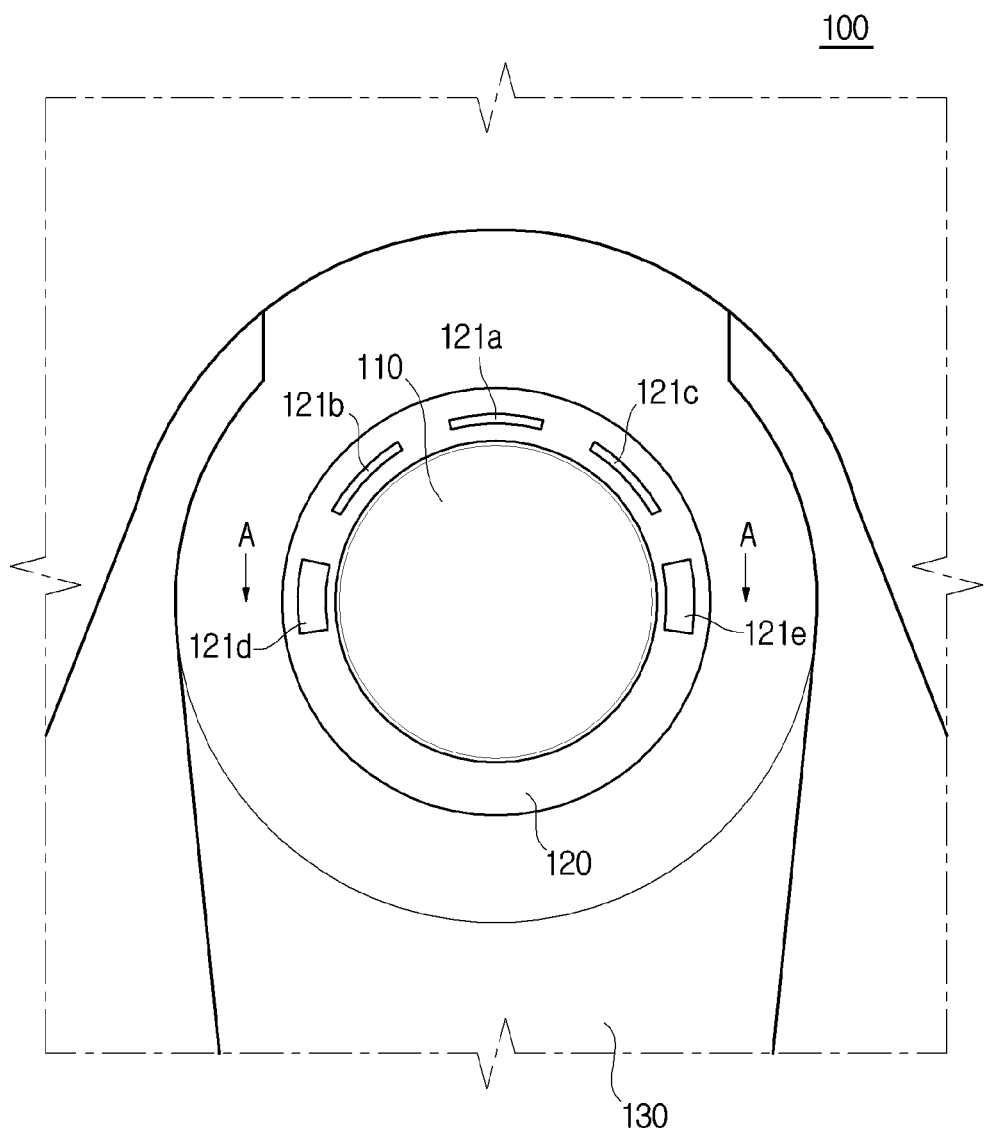
Figure 4C:
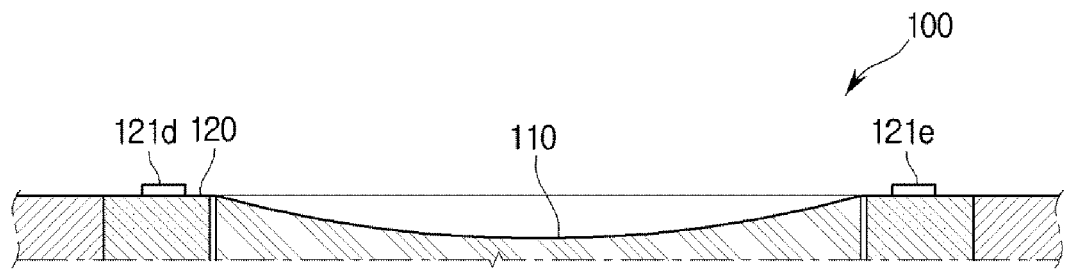
Figure 5A:
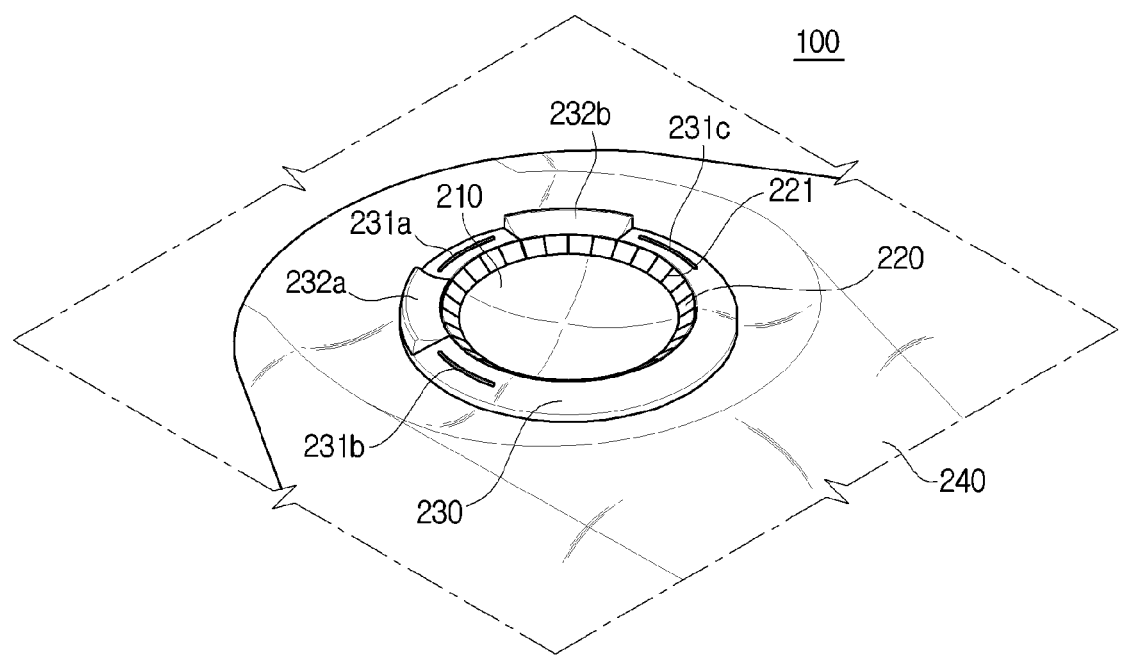
FIGS. 5A, 5B, and 5C are views for describing a touch input apparatus according to another embodiment of the present disclosure.
Figure 5B:
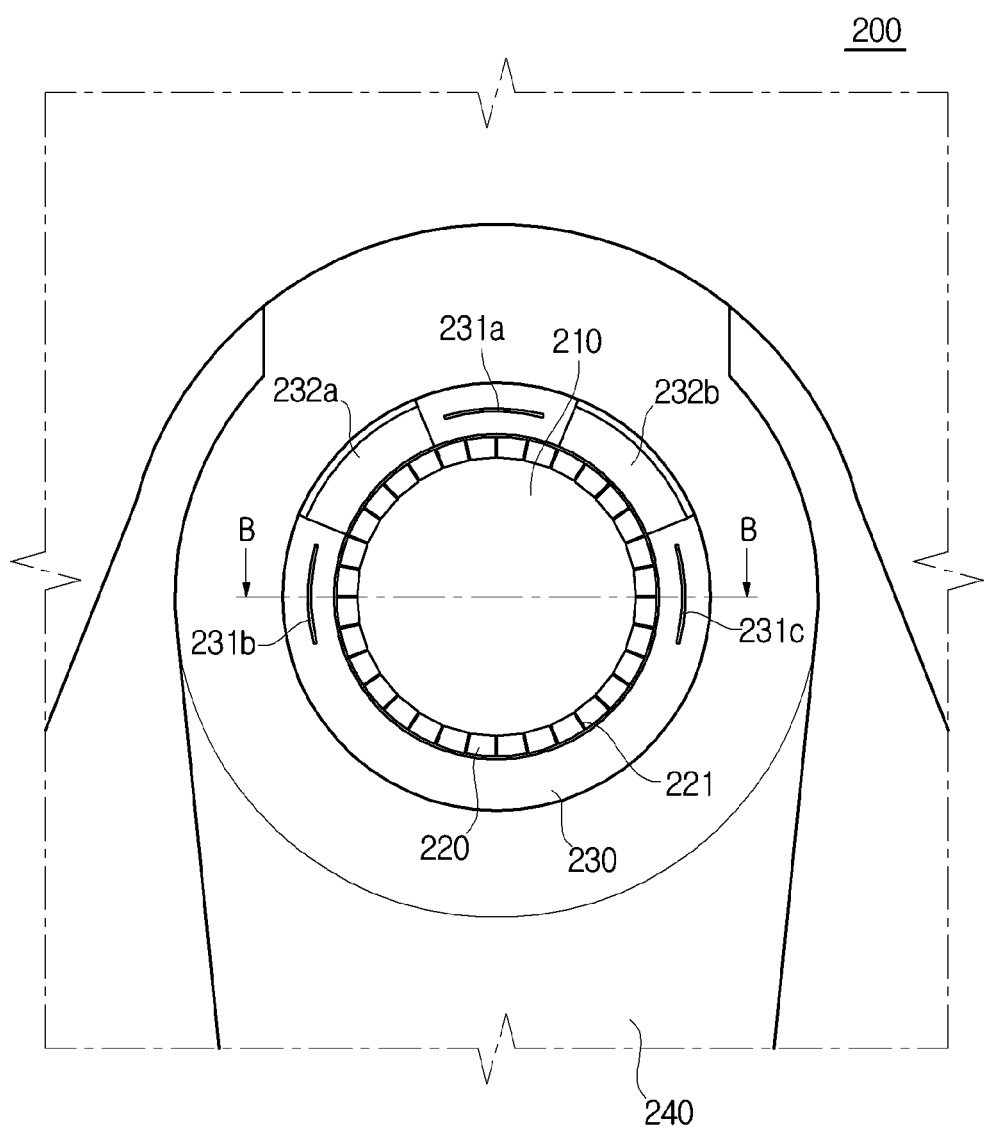
Figure 5C:
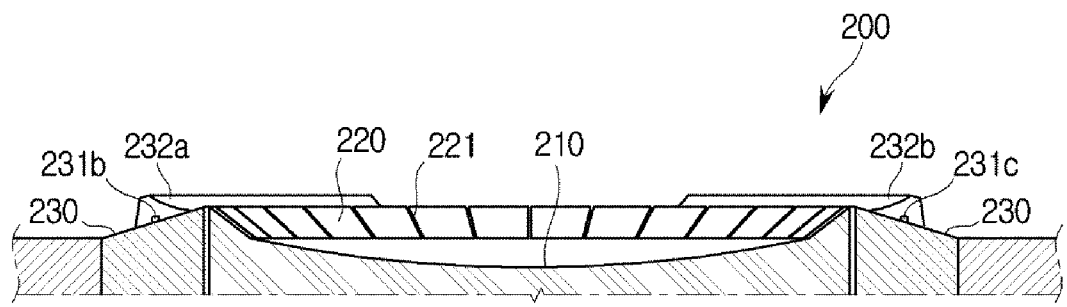

FIGS. 4A, 4B, and 4C are views depicting a touch input apparatus 100 according to one embodiment of the present disclosure. FIGS. 5A, 5B, and 5C are views depicting a touch input apparatus 200 according to another embodiment of the present disclosure.

FIG. 4A is a perspective view of a touch input apparatus 100 according to one embodiment of the present disclosure. FIG. 4B is a top view of the touch input apparatus 100 according to an embodiment of the present disclosure. FIG. 4C is a cross-sectional view of the touch input apparatus 200 according to an embodiment of the present disclosure, and taken along a line A-A of FIG. 4B.

The touch input apparatus 100 shown in FIGS. 4A, 4B, and 4C may include a touch portion 110 configured to sense a touch of a passenger. The touch input apparatus 100 may also include a border portion 120 surrounding the touch portion 110.

The touch portion 110 may be a touch pad to which a signal is input when a passenger either makes contact with, or approaches but does not contact the touch pad with, his/her finger or with a pointer such as a touch pen. The passenger may input a desired control command by making a predetermined touch gesture on the touch portion 110.

The touch pad may be a touch film or a touch sheet including a touch sensor, regardless of what the sheet or film is called. Also, the touch pad may be a touch panel which may be a display capable of detecting a touch operation made on a screen.

Recognizing a location of a pointer in a state in which the pointer is adjacent to the touch pad without being in contact with the touch pad is called "proximity touch". Recognizing a location of a pointer in a state in which the pointer is in contact with the touch pad is called "contact touch". The location of a pointer at which a proximity touch is recognized may be a location at which the pointer approaches a touch pad to be vertical to the touch pad.

The touch pad may be a resistive type touch pad, an optical type touch pad, a capacitive type touch pad, an ultrasonic type touch pad, or a pressure type touch pad. In other words, the touch pad may be one of various kinds of touch pads well-known in the art.

The border portion 120 may be an area surrounding the touch portion 110. The border portion 120 may be provided as a separate member that is distinct from the touch portion 110. In the border portion 120, one or more key buttons or touch buttons 121*a*, 121*b*, 121*c*, 121*d*, and 121*e* may be arranged in such a way to surround the touch portion 110. Accordingly, the passenger may input a control command by touching the touch portion 110 or by using any of the buttons 121*a*, 121*b*, 121*c*, 121*d*, or 121*e* that are arranged in the border portion 120 around the touch portion 110.

The touch input apparatus 100 may further include a wrist supporting portion 130 to support the wrist of the passenger. The wrist supporting portion 130 may be positioned higher than the touch portion 110. Since the wrist supporting part 130 is positioned higher than the touch portion 110, the wrist supporting portion 130 may prevent the passenger's wrist from being bent when he/she touches the touch portion 110 with his/her finger while putting his/her wrist on the wrist supporting portion 130. Accordingly, the wrist supporting portion 130 may protect the passenger from musculoskeletal system disorder while offering a good operation feeling.

The touch portion 110 may include an area that is lower than the boundary line with the border portion 120. In other words, the touch surface of the touch portion 110 may be lower than the boundary line with the border portion 120. For example, the touch surface of the touch portion 110 may be inclined downward from the boundary line with the border portion 120, or the touch surface of the touch portion 110 may have a step with respect to the boundary line with the border portion 120. For example, as shown in FIG. 4C, the touch portion 110 may include a concave, curved area.

Since the touch portion 110 includes an area lower than the boundary line with the border portion 120, the passenger may recognize the area of the touch portion 110 and the boundary line with his/her tactile impression. In the touch input apparatus 100, the center area of the touch portion 110 may have a high detection rate with respect to touch operations. Also, when the passenger inputs a touch operation, the passenger may intuitively recognize the touch area and the boundary line with his/her tactile impression. As a result, the passenger may apply the touch operation to an exact location resulting in an improvement in accuracy of the touch inputs.

The touch portion 110 may include a concave area, as described above. The term "concave" means a hollow or depressed shape, and may also include an inclined or a stepped shape, as well as a round depressed shape.

Referring to FIG. 4C, the touch portion 110 may include a concave curved surface. In this case, the concave curved surface of the touch portion 110 may have different curvatures according to an area. For example, the center area of the concave curved surface may have a relatively small curvature (a great radius of curvature), and the outer area of the concave curved surface may have a relatively great curvature (a small radius of curvature).

Since the touch portion 110 includes a curved surface, the passenger may feel improved touch sensation (or operation feeling) when applying a touch input to the touch portion 110. The curved surface of the touch portion 110 may similarly correspond to a trajectory drawn by a user fingertip's movement occurring when he/she moves his/her finger while fixing his/her wrist or when he/she rotates or twists his/her wrist while spreading out his/her fingers.

In addition, the touch portion 110 may have a circular shape. When the touch portion 110 has a circular shape, it may be easy to form a concave curved area in the touch portion 110. Also, when the touch portion 110 has a circular shape, the passenger may easily recognize the touch area of the touch portion 100 with his/her tactile feeling so that the passenger is able to easily input rolling or spin operations.

Also, since the touch portion 110 includes a curved surface the passenger may intuitively recognize at which location of the touch portion 110 his/her finger is positioned at. Also, since the touch portion 110 is curved, all points of the touch portion 110 may have different gradients. Accordingly, the passenger may intuitively recognize at which location of the touch portion 110 his/her finger touches, through a sense of the gradient felt by the finger of the passenger. In other words, the curved shape of the touch portion 110 may provide the passenger with feedback relative to the location of the touch portion 110 at which his/her finger is located when he/she makes a gesture on the touch portion 110 even though the eyes of the passenger might be looking at something other than the touch portion 110. As a result, the feedback helps the passenger make his/her desired gesture and improves the accuracy of the gesture inputs.

However, unlike the embodiment shown in FIGS. 4A to 4C, the concave area of a touch input apparatus according to another embodiment shown in FIGS. 5A to 5C may be divided into two areas including a center area and an outer area.

FIG. 5A is a perspective view of a touch input apparatus 200 according to another embodiment of the present disclosure. FIG. 5B is a top view of the touch input apparatus 200 according to another embodiment of the present disclosure. FIG. 5C is a cross-sectional view of the touch input apparatus 200 according to another embodiment of the present disclosure, particularly taken along a line B-B of FIG. 5B.

Referring to FIGS. 5A, 5B, and 5C, a touch input apparatus 200 may include a plurality of touch portions, such as touch portions 210 and 220 to detect a passenger's touch input and may include a border portion 230 surrounding the touch portions 210 and 220. The touch portion 210 may also be referred to herein as a gesture input portion, a gesture sensor, or a pressure sensor area. The touch portion 220 may also be referred to herein as a swiping input portion.

A method in which the touch portions 210 and 220 detect a touch input may be the same as the method described above in the embodiment of FIGS. 4A to 4C.

The border portion 230 surrounding the touch portions 210 and 220 may be provided as a separate member from the touch portions 210 and 220. In the border portion 230, one or more key buttons 232*a* and 232*b* or one or more touch buttons 231*a*, 231*b*, and 231*c* may be arranged in such a way to surround the touch portions 210 and 220. The passenger may input a gesture to the touch portions 210 and 220, or he/she may input a signal using any one of the buttons 231*a*, 231*b*, 232*a*, 232*b*, and 232*c* arranged in the border portion 230 around the touch portions 210 and 220.

As shown in FIGS. 5A to 5C, the touch input apparatus 200 may further include a wrist supporting portion 240 located below a gesture input portion. The wrist supporting portion may support the passengers wrist.

Referring to FIG. 5C, the touch portions 210 and 220 may include an area that is lower than the boundary line in the border portion 230. In other words, the touch surfaces of the touch portions 210 and 220 may be lower than the boundary line in the border portion 230. For example, the touch surfaces of the touch portions 210 and 220 may be inclined downward from the boundary line in the border portion 230, or the touch surfaces of the touch portions 210 and 220 may have a step with respect to the boundary line in the border portion 230. For example, as shown in FIG. 5C, the touch portions 210 and 220 may include a gesture input portion 210 including a concave curved area.

The shape of the touch portions 210 and 220 having a concave area may be the same as that of the touch portion 110 described in the embodiment of FIGS. 4A to 4C.

The touch portions 210 and 220 according to another embodiment of the present disclosure may include a swiping input portion 220 inclined downward along the circumference of the gesture input portion 210. When the touch portions 210 and 220 have a circular shape, the gesture input portion 210 may be a part of a spherical surface and the swiping input portion 220 may surround the circumference of the gesture input portion 210.

The swiping input portion 220 may detect a swiping gesture. For example, the passenger may input a swiping gesture along the swiping input portion 220 provided in the form of a circle. At this time, the passenger may input the swiping gesture in a clockwise or counterclockwise direction along the swiping input portion 220.

The swiping input portion 220 may include a plurality of gradations 221. The gradations 221 may visually or tactilely inform the passenger of a relative location. For example, the gradations 221 may be embossed or engraved. The gradations 221 may be arranged at regular intervals. Accordingly, the passenger may intuitively recognize the number of gradations through which his/her finger passes while making a swiping operation so as to accurately adjust the length of the swiping gesture.

According to one embodiment, a cursor that is displayed on the display 34 (see FIG. 2) may move according to the number of gradations 221 through or over which a finger passes when a swiping gesture is made. When the passenger makes a swiping gesture when various selected characters are successively displayed on the display 34, a selected character may move to the next character whenever the passengers finger passes through the gradation 221.

The gradient of the swiping input portion 220 shown in FIGS. 5A, 5B, and 5C may be greater than the gradient in the direction of the tangent of the swiping input portion 220 with respect to the boundary line between the swiping input portion 220 and the gesture input portion 210. Since the swiping input portion 220 is more steeply inclined than the gesture input portion 210, the passenger may intuitively recognize the gesture input portion 210 when the passenger inputs a gesture to the gesture input portion 210. While a gesture is input to the gesture input portion 210, no touch input applied on the swiping input portion 220 may be recognized. Accordingly, when the passenger inputs a gesture to the gesture input portion 210 until reaching the boundary line with the swiping input portion 220, the gesture input applied on the gesture input portion 210 may not overlap with any swiping gesture input applied on the swiping input portion 220.

The swiping input portion 220 may be integrated into the gesture input portion 210. Also, a plurality of touch sensors may be respectively installed in the gesture input portion 210 and the swiping input portion 220, or a touch sensor may be installed in the gesture input portion 210 and the swiping input portion 220. When the gesture input portion 210 and the swiping input portion 220 include a single touch sensor, the controller 300 depicted in FIG. 3 may distinguish the touch area of the gesture input portion 210 from the touch area of the swiping input portion 220. As a result, the controller 300 may distinguish a signal generated in correspondence to a touch input applied on the gesture input portion 210 from a signal generated in correspondence to a touch input applied on the swiping input portion 220.

The touch input apparatus 200 may further include a button input means. The button input means may be located around the touch portions 210 and 220. The button input means may include the touch buttons 231a, 231b and 231c, as well as the key buttons 232a, 232b, and 232c. The button input means may perform a function designated by an occupant's touch or a pressure on the button.

The pressure input apparatus 600 depicted in FIG. 3 may be implemented in various forms to sense the pressure by the occupant through a pressure sensing area. For example, the pressure input apparatus 600 may be provided inside the vehicle 1 to independently sense the pressure. The pressure input apparatus 600 may also be provided in combination with a configuration inside a vehicle 1.

The pressure input apparatus 600 may be implemented together with the above-described touch input apparatus 200 as one embodiment of the pressure input apparatus 600 provided in combination with a configuration inside the vehicle 1. In this embodiment, the touch portions 210 and 220, which are the touch sensing areas, and the pressure sensing area are provided together so that the pressure may be sensed together in the area where the touch is sensed. In this case, the occupant may input the pressure to the input apparatus 500 simultaneously with the touch.

Further, it is also possible that the pressure input apparatus 600 is coupled to the touch screen in which the touch input apparatus 200 is implemented with the display 34. As a result, it is also possible for the occupant to input the touch and the pressure at the desired position of the arbitrary image displayed on the touch screen at the same time.

The pressure input apparatus 600 may sense the pressure by the occupant in various known ways. The pressure input apparatus 600 according to one embodiment is configured to sense the pressure by the occupant using a pressure sensor, a capacitance sensor, a force sensor, or the like provided at the lower part of the pressure sensing area. In addition, the pressure input apparatus 600 provided by being coupled to the touch screen may sense the pressure by the occupant based on a change in the distance between a cover glass and a backlight in the touch screen. In particular, the pressure input apparatus 600 may sense different degrees of pressure as well as the presence of the pressure, based on the distance between the cover glass and the backlight.

Hereinafter, for convenience of explanation, the touch input apparatus 200 is implemented according to the embodiment of FIGS. 5A to 5C. The pressure input apparatus 600 depicted in FIG. 3 is implemented integrally with the touch input apparatus 200. In other words, referring to the input apparatus 500, it may be assumed that the touch portions 210 and 220, which are the touch sensing areas of the touch input apparatus 200, are used as the pressure sensing area of the pressure input apparatus 600.

Referring again to FIG. 3, the vibration generator 700 may be implemented by a plurality of actuators that generate vibration by being driven according to an electrical signal. The actuator may generate vibration according to various known methods. For example, the actuator may utilize the eccentric force caused by the rotation of the motor. The actuator may also use a permanent magnet reciprocating in the solenoid. Alternatively, the actuator may be implemented as a plate-shaped piezoelectric ceramic actuator.

Further, the vibration generator 700 may generate a vibration at the lower part of the pressure sensing area of the input apparatus 500. The vibration may serve as feedback of the pressure that is input to the input apparatus 500. Specifically, the vibration generator 700 may include a plurality of actuators arranged in a shape corresponding to the pressure sensing area and may generate vibration using an actuator corresponding to the sensed position of the pressure sensed through the pressure sensing area. The vibration generated is transmitted to the pressure sensing area and the occupant may sense the vibration as the feedback to the pressure input.

In addition, the vibration generator 700 may generate the vibration as the feedback to the direction of the sensed pressure as well as the position of the sensed pressure through the pressure sensing area of the pressure input apparatus 600.

Hereinafter, the structure of the vibration generator 700 that generates vibration as feedback to the direction of the pressure is described below with reference to FIGS. 6A and 6B.

Figure 6A:
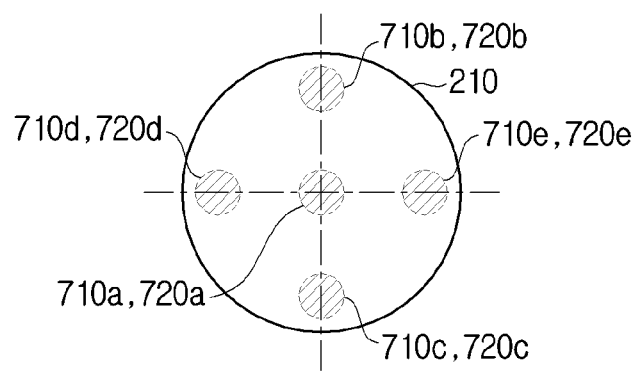
FIG. 6A is a schematic plan view for explaining a position where a vibration generator is provided according to one embodiment of the present disclosure.

FIG. 6A is a schematic plan view depicting a position where the vibration generator is provided according to one embodiment. FIG. 6B is a schematic perspective view depicting a position where the vibration generator is provided according to one embodiment.

Figure 6B:
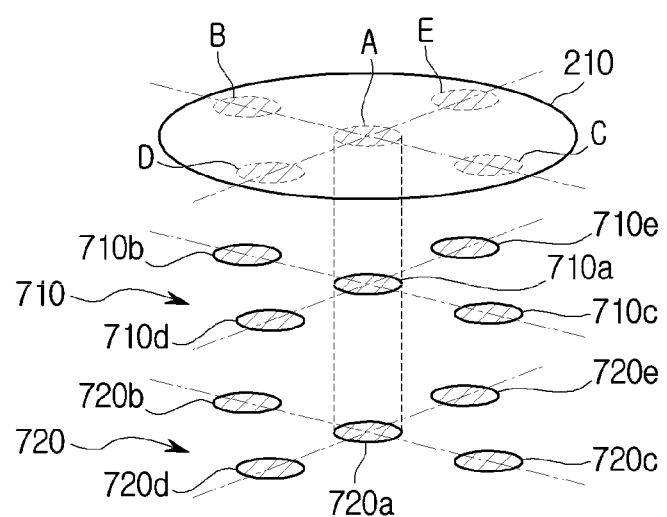
FIG. 6B is a schematic perspective view for explaining a position where the vibration generator is provided according to one embodiment of the present disclosure.

In FIGS. 6A and 6B, it may be assumed that the gesture sensor 210 of the touch sensing area of the input apparatus 500 is shared with the pressure sensing area. FIGS. 6A and 6B depict the pressure sensing area and the vibration generating unit 700. The relationship between the pressure sensing area and the vibration generating unit 700 is also depicted in FIGS. 6A and 6B.

As described above, the vibration generator 700 may be provided in a shape corresponding to the pressure sensing area 210. The vibration generator 700 may also be provided below the pressure sensing area 210. In this case, the vibration generator 700 may be composed of two layers stacked in the lower side of the pressure sensing area 210. The vibration generator 700 may include a first layer 710 relatively adjacent or nearer to the pressure sensing area 210 and a second layer 720 relatively further from the pressure sensing area 210. The pressure sensing area 210 may be said to include or define a plurality of pressure sensing positions A, B, C, D and E of the pressure sensing area. Each one of the pressure sensing positions A, B, C, D, and E may correspond in position with actuators of the plurality of actuators included in the first layer 710 and the second layer 720.

The plurality of actuators is arranged in the first layer 710 and in the second layer 720. Each layer may have the same number of actuators arranged in the same configuration. In FIGS. 6A and 6B, the first layer 710 located below the circular pressure sensing area 210 includes a central first actuator 710a and second, third, fourth, and fifth actuators 710b, 710c, 710d and 710e. The second through fifth actuators 710b-710e included in the first layer 710 are arranged to surround the first actuator 710a of the first layer at intervals of 90 degrees in this embodiment. The second layer 720 located below the first layer 710 includes a first actuator 720a at the center and second, third, fourth, and fifth actuators 720b, 720c, 720d, and 720e. The second through fifth actuators 720b-720e included in the second layer 720 are arranged to surround the first actuator 720a of the second layer at intervals of 90 degrees in this embodiment. The actuators 710a-710e of the first layer 710 are positioned to correspond with the respective actuators 720a-720e of the second layer 720. Further, the pressure sensing position A corresponds with the actuators 710a and 720a. The same relationship applies to the pressure sensing positions B-E and the respective actuators 710b, 720b-710e, 720e.

Since the first layer 710 and the second layer 720 are arranged independently of each other, a vibration may be generated according to different pressure conditions.

Referring again to FIG. 3, the controller 300 may control the vibration generator 700 to generate a first vibration at a position corresponding to the pressure sensing position in the pressure sensing area 210 by the first layer 710. The controller 300 may also control the vibration generator to generate a second vibration at a position corresponding to the direction of the sensed pressure by the second layer 720.

Hereinafter, a method of controlling the vibration generator 700 by the controller 300 is described in detail with reference to FIGS. 3, 7A, 7B, 8, and 9.

Figure 7A:
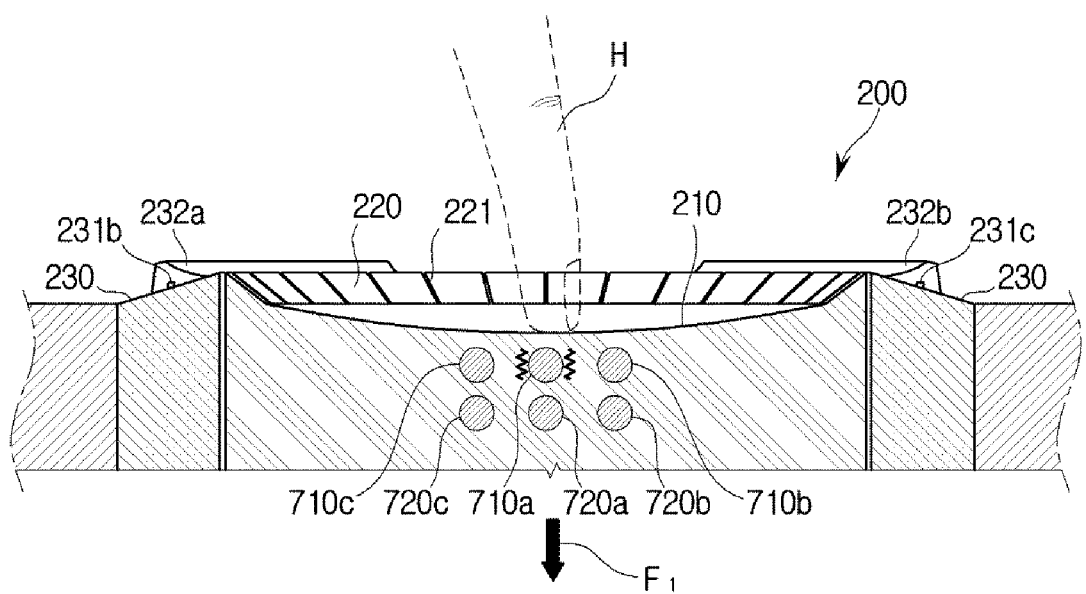
FIG. 7A is a view illustrating an example where a first vibration is generated using a first layer of the vibration generator according to one embodiment of the present disclosure.
Figure 7B:
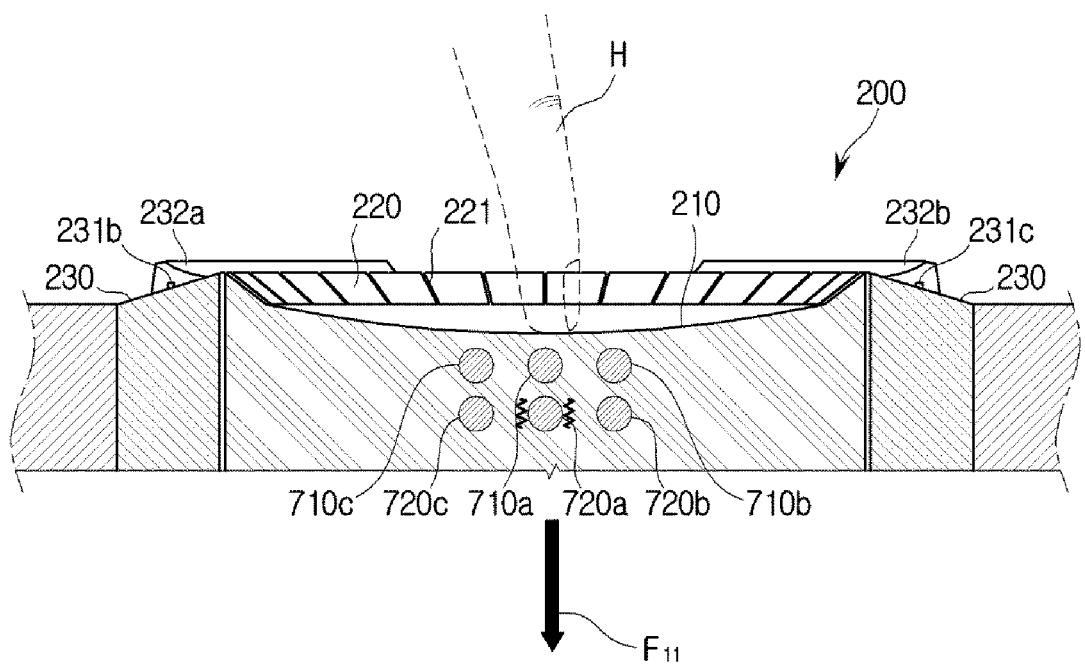
FIG. 7B is a view illustrating an example where a second vibration is generated using a second layer of the vibration generator according to one embodiment of the present disclosure.

FIG. 7A is a view illustrating an example where a first vibration is generated using a first layer of the vibration generator according to one embodiment. FIG. 7B is a view illustrating an example where a second vibration is generated using a second layer of the vibration generator according to another embodiment. As shown in FIGS. 7A and 7B, the first actuator 710a located at the center, the second actuator 710b located at the right side, and the third actuator 710c located at the left side are arranged on the first layer 710. The first actuator 720a located at the center, the second actuator 720b located at the right side, and the third actuator 720c located at the left side are arranged on the second layer 720.

The controller 300 may control the vibration generator 700 to generate the first vibration using the actuator corresponding to the pressure sensing position A-E among the plurality of actuators constituting the first layer 710. At this time, the controller 300 may determine an actuator to generate the first vibration based on the sensing position of the pressure and the distance of each of the plurality of actuators constituting the first layer 710.

For example, the controller 300 may control the vibration generator 700 to generate the first vibration using the actuator closest to the pressure sensing position among the plurality of actuators constituting the first layer 710.

Referring to FIG. 7A, when a F1 pressure by a finger H is sensed in the pressure sensing area 210, the controller 300 controls the vibration generator 700 to generate the first vibration using the first actuator 710a closest to the sensing position of the pressure among the plurality of actuators constituting the first layer 710.

The controller 300 may control the vibration generator 700 to generate the second vibration by the second layer 720 when the sensed pressure intensity is equal to or higher than a predetermined reference intensity. In FIG. 7A, it may be confirmed that the second vibration does not occur by the second layer 720 because the sensed pressure F1 is less than the predetermined reference intensity.

On the other hand, in FIG. 7B, an example is illustrated where a sensed pressure F11 is equal to or higher than the reference intensity. The controller 300 may then control the vibration generator 700 to generate the second vibration using the actuator corresponding to the direction of the sensed pressure among the plurality of actuators constituting the second layer 720.

Since pressure is a type of force, the pressure may be expressed as a directional vector. Accordingly, the pressure input apparatus 600 may sense not only the presence of the input pressure and the intensity of the pressure but also the direction of the pressure. The controller 300 uses the vibration generator 700 to generate the second vibration by using the direction of the pressure.

To this end, the controller 300 according to one embodiment may determine the actuator used to generate the second vibration based on the area on the second layer 720 corresponding to the sensed pressure direction. For example, when the actuator is arranged on the second layer 720 as shown in FIGS. 6A and 6B, the controller 300 may divide the area of the second layer 720 into five regions, i.e., the pressure sending positions A-E. The direction of the sensed pressure may correspond to one of the five divided regions of the second layer 720. The controller 300 may use the actuator belonging to the corresponding region to generate the second vibration.

In FIG. 7B, the controller 300 may divide an area of the second layer 720 into a central area or pressure sensing position A to which the first actuator 720*a* belongs, a right area B to which the second actuator 720*b* belongs, and a left area C to which the third actuator 720*c* belongs. Since the direction of the sensed pressure F11 is the vertical direction, the direction of the sensed pressure F11 may correspond to the central region A of the second layer 720. Accordingly, the control unit 300 may control the vibration generator 700 to generate the second vibration using the first actuator 720*a* belonging to the central region A.

In addition, the controller 300 according to another embodiment may determine an actuator used to generate the second vibration based on the difference between the direction of the sensed pressure and the direction from the position of the sensed pressure to each of the plurality of actuators constituting the second layer 720. For example, the controller 300 may set a virtual line in the direction of the pressure passing through the sensing position of the pressure and use the actuator nearest to the virtual line to generate the second vibration.

In FIG. 7B, the controller 300 sets the virtual line in the direction of the pressure F11 as passing through the sensing position of the pressure. The controller then generates the second vibration using the first actuator 720*a* closest to the set virtual line.

The controller 300 may then control the vibration generator 700 to sequentially generate the first vibration and the second vibration. In other words, the controller 300 controls the vibration generator 700 to generate the first vibration when the pressure is sensed. The controller 300 then controls the vibration generator 700 to generate the second vibration when the first vibration is stopped.

Alternatively, it is also possible that the first vibration and the second vibration occur at the same time. Hereinafter, with reference to FIGS. 8 and 9, an example where the first vibration and the second vibration are generated simultaneously is described.

Figure 8:
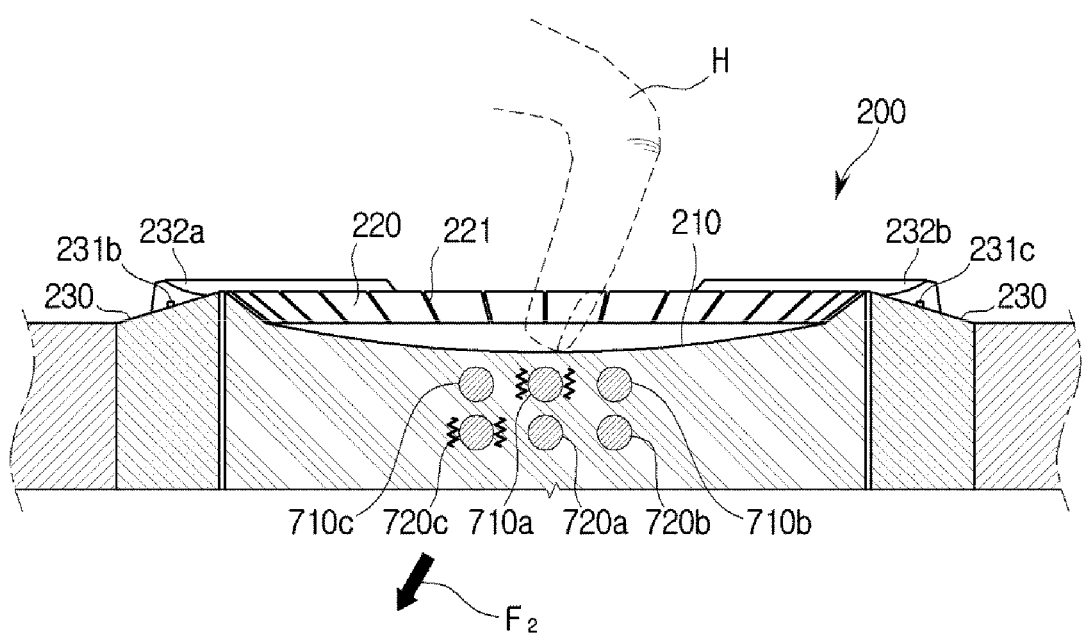
FIG. 8 is a view in which the vibration generator, according to one embodiment of the present disclosure, simultaneously generates the first vibration and the second vibration.
Figure 9:
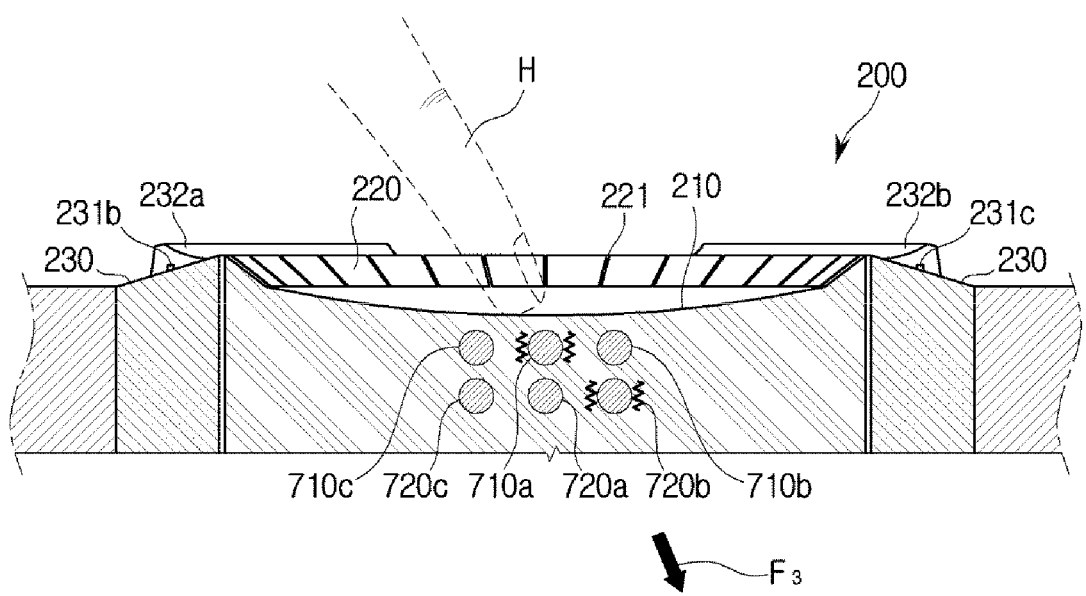
FIG. 9 is a view in which a vibration generator, according to another embodiment of the present disclosure, simultaneously generates a first vibration and a second vibration.

FIG. 8 is a view in which the vibration generator 700 according to one embodiment simultaneously generates the first vibration and the second vibration. FIG. 9 is a view in which the vibration generator 700 according to another embodiment simultaneously generates the first vibration and the second vibration.

As shown in FIG. 8, when a pressure F2 generated by a finger H is sensed in the pressure sensing area 210, the controller 300 controls the vibration generator 700 to generate the first vibration using the first actuator 710*a*, which is closest to the sensing position of the pressure in the first layer 710.

At the same time, when the pressure F2 is equal to or higher than the predetermined reference pressure, the controller 300 may control the vibration generator 700 to generate the second vibration using the second layer 720. Specifically, the controller 300 may divide the area of the second layer 720 into a central area or pressure sensing position A to which the first actuator 720*a* belongs, a right area B to which the second actuator 720*b* belongs, and a left area C to which the third actuator 720*c* belongs. In this embodiment, since the direction of the sensed pressure F2 is a direction inclined from the vertical direction to the left, the direction of the sensed pressure F2 may correspond to the left region C of the second layer 720. Therefore, the controller 300 may control the vibration generator 700 to generate the second vibration using the third actuator 720*c* belonging to the left area.

Alternatively, the controller 300 may set the virtual line in the direction of the pressure passing through the sensing position of the pressure. The controller 300 may then use the actuator nearest to the virtual line to generate the second vibration. In FIG. 8, the controller 300 sets a virtual line in the direction of the pressure F2 as passing through the sensing position of the pressure. The controller 300 then uses the third actuator 720*c* that is closest to the set virtual line to generate the second vibration.

FIG. 9 illustrates an example in which a pressure F3 generated by a finger H is sensed in the pressure sensing area 210. When the pressure F3 is sensed, the controller 300 depicted in FIG. 3 may control the vibration generator 700 to generate the first vibration using the first actuator 710*a* that is closest to the sensing position of the pressure in the first layer 710.

At the same time, when the pressure F3 is equal to or higher than the predetermined reference pressure, the controller 300 may control the vibration generator 700 to generate the second vibration using the second layer 720. Specifically, the controller 300 may divide the area of the second layer 720 into a central area or pressure sensing position A to which the first actuator 720*a* belongs, a right area B to which the second actuator 720*b* belongs, and a left area C to which the third actuator 720*c* belongs. Since the direction of the sensed pressure F3 is a direction inclined from the vertical direction to the right, the direction of the sensed pressure F3 may correspond to the right region B of the second layer 720. Accordingly, the controller 300 may control the vibration generator 700 to generate the second vibration using the second actuator 720*b* belonging to the right area.

Alternatively, the controller 300 may set the virtual line in the direction of the pressure passing through the sensing position of the pressure. The controller 300 may then use the actuator nearest to the virtual line to generate the second vibration. In FIG. 9, the controller 300 sets the virtual line in the direction of the pressure F3 as passing through the sensing position of the pressure. The controller 300 then generates the second vibration using the second actuator 720*b* closest to the set virtual line.

In the foregoing embodiments, the first vibration and the second vibration are generated either sequentially or simultaneously. However, the disclosure is not limited to these examples, as it is only one embodiment of the generation time and the duration of the first vibration and the second vibration.

The display 34 may also be used to control a navigation system of a vehicle 1. The pressure may be input for a focus shift on the map of the navigation system displayed via the display 34. The occupant may input the pressure for moving the focus to perform a map search and the like. The controller 300 controls the display 34 to move the focus based on the direction of the input pressure. The vibration generator 700 may be controlled to generate the first vibration and the second vibration as feedback.

In addition, the pressure may also be input for controlling the volume ratio of the plurality of speakers 60 in the vehicle 1. For example, when the speakers 60 are installed at a plurality of positions in the vehicle 1, an occupant may control the volume ratio of the speaker 60 by inputting the pressure in the direction of the desired speaker 60. The controller 300 may control the volume ratio of the speaker 60 located in the direction of the input pressure to be lower or higher. The controller 300 also may control the vibration generator 700 to generate the first vibration and the second vibration as the feedback to the input pressure.

In this way, the vehicle 1 may provide more direct and intuitive feedback to the occupant.

Figure 10:
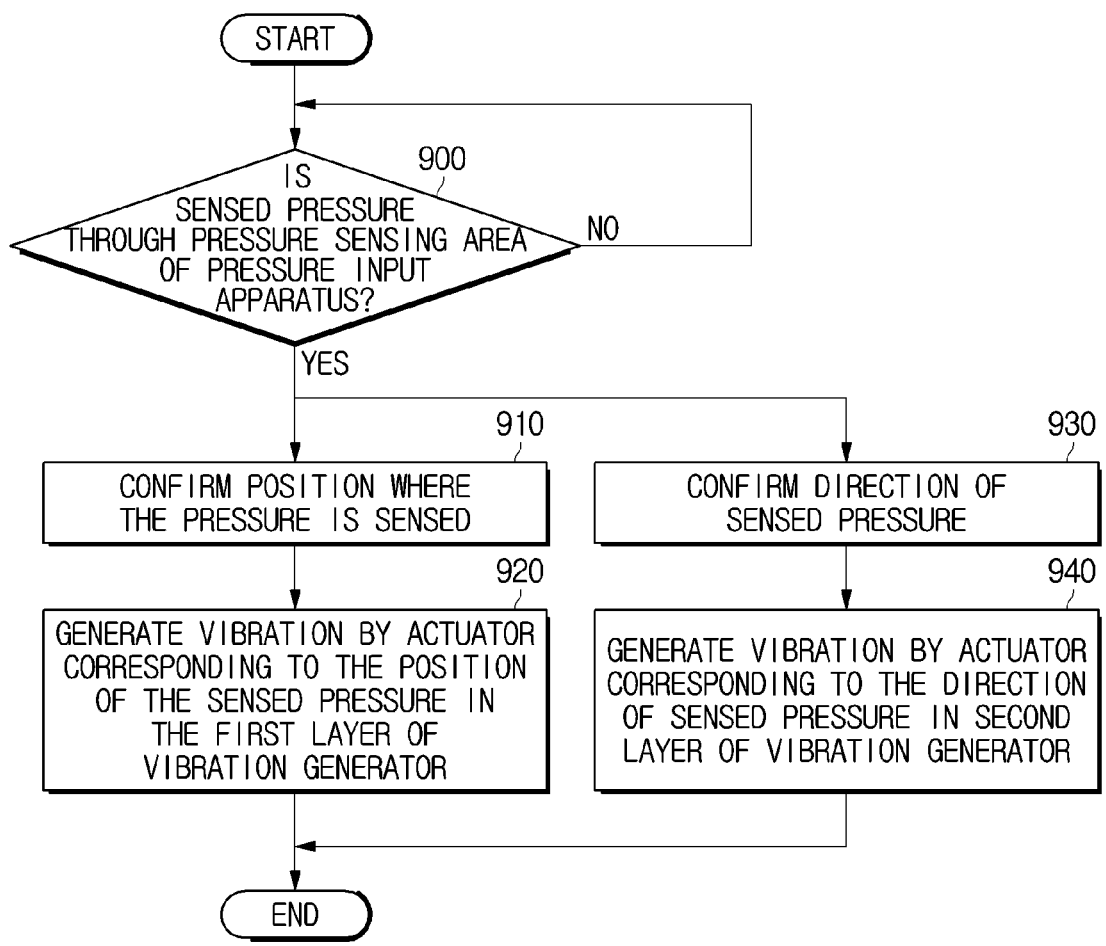
FIG. 10 is a flowchart of a vehicle control method according to one embodiment of the present disclosure.

FIG. 10 is a flowchart of a vehicle 1 that depicts a control method according to one embodiment.

First, the vehicle 1 may confirm whether pressure is sensed through the pressure sensing area 210 of the pressure input apparatus 600 (see 900 in FIG. 10). When the pressure is not sensed, the vehicle 1 may repeatedly confirm whether the pressure is sensed through the pressure sensing area 210 of the pressure input apparatus 600.

On the other hand, when the pressure is sensed, the vehicle 1 may confirm the position where the pressure is sensed (see 910 in FIG. 10). Specifically, the controller 300 of the vehicle 1 may confirm the position of the pressure sensing area 210 of the vehicle 1 where the pressure is sensed.

When the position where the pressure is sensed is confirmed, the vehicle 1 may generate a vibration by the actuator corresponding to the position of the sensed pressure in the first layer 710 of the vibration generator 700 (see 920 in FIG. 10). For example, the controller 300 of the vehicle 1 may control the vibration generator 700 of the vehicle 1 to generate vibration using the actuator of the first layer 710 closest to the pressure sensing position.

The vehicle 1 may confirm the direction of the sensed pressure (see 930 in FIG. 10). Specifically, the controller 300 of the vehicle 1 may confirm the direction of the sensed pressure as a vector.

When the direction of the pressure is confirmed, the vehicle 1 may generate vibration by the actuator corresponding to the direction of the sensed pressure in the second layer 720 of the vibration generator 700 (see 940 in FIG. 10). For example, the controller 300 of the vehicle 1 may divide the second layer 720 into a plurality of regions or pressure sensing positions A-E and identify a divided region corresponding to the sensed pressure direction. Then, the controller 300 may control the vibration generator 700 to generate the second vibration using the actuator belonging to the identified divided region.

According to one embodiment of the disclosed vehicle and its control method, the vibration is generated in the pressure sensing area of the input apparatus in consideration of the direction of the sensed pressure, thereby providing more intuitive and direct feedback to the occupant.

Although various embodiments of the present disclosure have been shown and described herein, it should be appreciated by those having ordinary skill in the art that changes may be made in the disclosed embodiments without departing from the principles and spirit of the disclosure, the scope of which is defined in the claims and their equivalents.

What is claimed is:

1. A vehicle comprising:
an input apparatus configured to sense pressure through a pressure sensing area;
a vibration generator configured to include a first layer and a second layer, in which a plurality of actuators for generating vibration is arranged, the first layer and second layer stacked at positions corresponding to a plurality of pressure sensing positions of the pressure sensing area; and
a controller configured to control the vibration generator to generate a first vibration at a position corresponding to a sensing position of the pressure on the pressure sensing area through the first layer and to generate a second vibration at a position corresponding to a direction of the sensed pressure on the pressure sensing area through the second layer,
wherein the vibration generator includes the first layer relatively adjacent to the pressure sensing area and the second layer relatively further from the pressure sensing area,
wherein the controller is configured to determine an actuator used to generate the first vibration based on a distance between the position of the sensed pressure and each of the plurality of actuators constituting the first layer and to control the vibration generator to generate the first vibration by using the determined actuator corresponding to the position of the sensed pressure among the plurality of actuators constituting the first layer, and
wherein the controller is configured to control the vibration generator to generate the second vibration at the position corresponding to the direction of the sensed pressure in the pressure sensing area through the second layer when the sensed pressure is equal to or higher than a predetermined reference intensity.

2. The vehicle according to claim 1, wherein the controller is configured to control the vibration generator to generate the second vibration by using an actuator corresponding to a direction of the sensed pressure among the plurality of actuators constituting the second layer.

3. The vehicle according to claim 2, wherein the controller is configured to determine an actuator used to generate the second vibration based on an area on the second layer corresponding to the direction of the sensed pressure.

4. The vehicle according to claim 2, wherein the controller is configured to determine an actuator used to generate the second vibration based on a difference between the direction of the sensed pressure and the direction from the position of the sensed pressure to each of the plurality of actuators constituting the second layer.

5. The vehicle according to claim 1, wherein the controller is configured to control the vibration generator to sequentially generate the first vibration and the second vibration.

6. The vehicle according to claim 1, wherein the input apparatus is configured to sense the pressure through the pressure sensing area having a concave shape.

7. The vehicle according to claim 6, wherein each of the plurality of actuators arranged in the first layer of the vibration generator is provided at a position corresponding to each of the plurality of actuators arranged in the second layer.

8. A method of controlling a vehicle having an input apparatus configured to sense a pressure through a pressure sensing area and a vibration generator including a first layer and a second layer, in which a plurality of actuators for generating a vibration is arranged, the first layer and second layer being stacked at positions corresponding to a plurality of pressure sensing positions of the pressure sensing area, the method comprising:

sensing the pressure through the pressure sensing area;

generating a first vibration at a position corresponding to a position of the sensed pressure in the pressure sensing area through the first layer; and generating a second vibration at a position corresponding to a direction of the sensed pressure in the pressure sensing area through the second layer, wherein the vibration generator includes the first layer relatively adjacent to the pressure sensing area and the second layer relatively further from the pressure sensing area, wherein the generating the first vibration comprises:
determining an actuator used to generate the first vibration based on a distance between the position of the sensed pressure and each of the plurality of actuators constituting the first layer; and
generating the first vibration using the determined actuator corresponding to the position of the sensed pressure among the plurality of actuators constituting the first layer, and wherein the generating the second vibration comprises generating the second vibration at the position corresponding to the direction of the sensed pressure in the pressure sensing area through the second layer when the sensed pressure is equal to or higher than a predetermined reference intensity.

9. The method according to claim 8, wherein the generating the second vibration comprises generating the second vibration using an actuator corresponding to the direction of the sensed pressure among the plurality of actuators constituting the second layer.

10. The method according to claim 9, wherein the generating the second vibration comprises:
determining an actuator used to generate the second vibration based on an area corresponding to the direction of the sensed pressure on the second layer.

11. The method according to claim 9, wherein the generating the second vibration comprises:
determining an actuator used to generate the second vibration based on a difference between the direction of the sensed pressure and the direction from the position of the sensed pressure to each of the plurality of actuators constituting the second layer.

12. The method according to claim 8, wherein the generating the second vibration comprises generating the second vibration after the first vibration is stopped.

13. The method according to claim 8, wherein the sensing the pressure comprises sensing the pressure through the pressure sensing area having a concave shape.

14. The method according to claim 8, wherein each of the plurality of actuators arranged in the first layer of the vibration generator is provided at a position corresponding to each of the plurality of actuators arranged in the second layer.

* * * * *